(12) United States Patent
Kang

(10) Patent No.: US 7,643,897 B2
(45) Date of Patent: Jan. 5, 2010

(54) METHOD FOR AUTOMATICALLY CHECKING SEQUENCE OF LOADING BOATS AND BATCHES FOR SEMICONDUCTOR MANUFACTURING PROCESS

(75) Inventor: Chien-Ting Kang, Pingtung County (TW)

(73) Assignee: United Microelectronics Corp., Hsinchu (TW)

( * ) Notice: Subject to any disclaimer, the term of this patent is extended or adjusted under 35 U.S.C. 154(b) by 118 days.

(21) Appl. No.: 11/759,628

(22) Filed: Jun. 7, 2007

(65) Prior Publication Data

US 2008/0306623 A1 Dec. 11, 2008

(51) Int. Cl.
*G06F 19/00* (2006.01)
*B65B 21/02* (2006.01)

(52) U.S. Cl. .................. 700/114; 414/404; 700/111; 700/112; 700/113

(58) Field of Classification Search ......... 700/111–114, 700/213; 414/404
See application file for complete search history.

(56) References Cited

U.S. PATENT DOCUMENTS

| | | | |
|---|---|---|---|
| 4,075,972 A * | 2/1978 | Yamawaki et al. | 118/668 |
| 4,355,974 A * | 10/1982 | Lee | 432/253 |
| 4,457,661 A * | 7/1984 | Flint et al. | 414/404 |
| 4,493,606 A * | 1/1985 | Foulke et al. | 414/787 |
| 4,515,104 A * | 5/1985 | Lee | 118/500 |
| 4,611,966 A * | 9/1986 | Johnson | 414/404 |
| 4,833,621 A * | 5/1989 | Umatate | 716/21 |
| 4,996,436 A * | 2/1991 | Doeuvne et al. | 250/559.4 |
| 5,048,164 A * | 9/1991 | Harima | 29/25.01 |
| 5,445,486 A * | 8/1995 | Kitayama et al. | 414/416.03 |
| 5,725,664 A * | 3/1998 | Nanbu et al. | 118/52 |
| 2008/0127467 A1* | 6/2008 | Hirano et al. | 29/25.01 |

OTHER PUBLICATIONS

Bixby et al., titled, "Short-Interval Detailed Production Scheduling in 300mm Semiconductor Manufacturing Using Mixed Integer and Constraint Programming", May 2006, IEEE. pp. 148-154.*

* cited by examiner

*Primary Examiner*—Ramesh B Patel
*Assistant Examiner*—Thomas H Stevens
(74) *Attorney, Agent, or Firm*—Winston Hsu

(57) ABSTRACT

A method for automatically checking a sequence of loading boats and batches for a semiconductor manufacturing process is provided. According to a developed logic, a loading sequence is automatically calculated by a system. By comparing the actual loading sequence with the calculated sequence when the boats are entering, it is ensured that no errors occur when loading the boats in the batches. When loading the boats in the batches, operators can truly load the boats in the batches according to the entering sequence together with the current confirmation mechanism, so as to ensure the boat positions for the loaded materials to be correct. The method for automatically checking the sequence of loading boats and batches is further capable of calculating the loading sequence through the developed logic by automatically determining runnable boat positions for the material after recording a parameter for detecting a previous boat by the system.

8 Claims, 12 Drawing Sheets

| Number of Entered Batches | 1 | 2 | 3 | 4 | 5 | 6 |
|---|---|---|---|---|---|---|
| Boat Table | D | C | C | B | B | A |
320
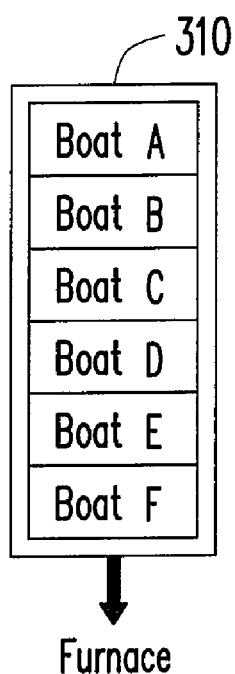
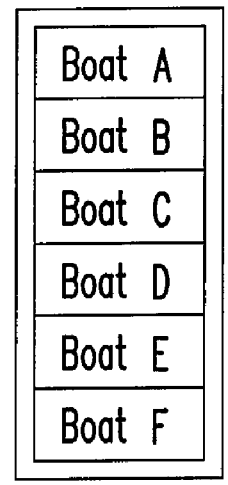
If the number of the entered batches =4
If the number of the entered batches =3
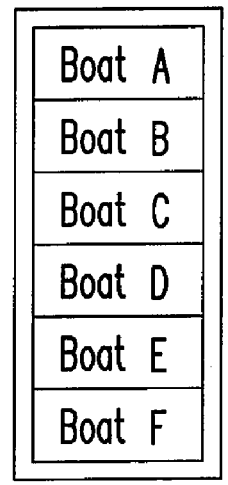
FIG. 3

Product Model: CY63315A

Precautions: if the boat is not 2 (the specification boat Y=2), the boat is rejected to enter the station Number of the entered batches =4

| Number of Entered Batches | 1 | 2 | 3 | 4 | 5 | 6 |
|---|---|---|---|---|---|---|
| Initial Boat | C | C | B | (B) | B | A |

410 (pointing to column 4)

| Notice Items for Types | | | | | | | |
|---|---|---|---|---|---|---|---|
| Notice Type By ○Batch No. ●Type No. ○Process | | | | | | | |
| Type CY6315A ▼ | | | Process M8B3Q ▼ | | Version of Process 1 ▶ | | |
| Notice Type | No.of Process | Process | Serial No. of Path/Replacement Path/No. of Path/Path | Serial No. of Process/No. of Process/Process | Notice Items | Attach to Dispatch | Attach to Dispatch |
| PRODU | M8B3Q | 1 | 26000/1/G4K2/ G0X65 | 20/5321/G0X65 | DPOLY Deposition is limited to boat of DP-1; DP-5; DP-6 | ●YES ○NO | ●YES ○NO |
| PROCE | M8B3Q | 1 | 26000/1/G4K2/ G0X65 | 50/5804/Thickness Measure -TOX-INT | DPOLY Deposition is limited to RUN in boat1, boat2, boat3 of DPOLY-1;DPOLY-5,DPOLY-6 and boat1 of DPOLY4 | ●YES ○NO | ●YES ○NO |
| PROCE | M8B3Q | 1 | 26000/1/G4K5/ G0X65 | 50/5804/Thickness Measure -TOX-INT | | ●YES ○NO | ●YES ○NO |
| PRODU | M8B3Q | 1 | 27000/1/G598/ D-POLY Deposition | 10/5121/D-PL Deposition 3KL45 | | ●YES ○NO | ●YES ○NO |
| PRODU | M8B3Q | 1 | 27500/1/A875/ BARC-P1 alignment -DUV | 30/0816/ADI-CD-P1 | Please measure and save images in SEMCD-1/9P or B9P/BAP | ●YES ○NO | ●YES ○NO |

| I INSERT | U Modify | R CLEAR | D Delete | F Search | J ShortCut |
|---|---|---|---|---|---|

| EXIT | C Clear | A Add | | | | | |

NO TICE HISTORY

FIG. 5A

Notice Items for Types

Notice Type By: ○ Batch No.  ○ Type No.  ⦿ Process

Process: [H8N36 ▶]    Version of Process: [1 ▶]

| Notice Type | No.of Process | Process | Serial No. of Path/Replacement Path/No. of Path/Path | Serial No. of Process/No. of Process/Process | Notice Items | Attach to Dispatch | Attach to Dispatch |
|---|---|---|---|---|---|---|---|
| PROCE | H8N36 | 1 | 1000/1/J021/Wafers Submit -UMC-CMP4 | 20/7001/Wafer Submit | NO.: NOTCH terminal | ⦿ YES ○ NO | ⦿ YES ○ NO |
| PROCE | H8N36 | 1 | 4000/1/G114/Nitride Silicide Deposition1000 | 10/5208/Nitride Silicide Deposition1000 | The batch is limited to KE machine and be disposed ahead a position before batch PD<70, positions beside the position PD<70 | ⦿ YES ○ NO | ⦿ YES ○ NO |
| PROCE | H8N36 | 1 | 6000/1/D000/Nitride Silicide Etching | 40/3080/Photoresist Remove | | ⦿ YES ○ NO | ⦿ YES ○ NO |
| PROCE | H8N36 | 1 | 14000/1/G416/SACFOX-300 | 10/5004/RCA Clean A30S | | ⦿ YES ○ NO | ⦿ YES ○ NO |
| PROCE | H8N36 | 1 | 14800/1/H174/POLY1 Oxidation64 | 10/940D/Turn 90 degrees at Flat side of the Acid Trough | Clear the line and Turn the flat side to a position to 90 degrees | ⦿ YES ○ NO | ⦿ YES ○ NO |

FIG. 5B

The algorithm logic is drawn up according to the following table

N/T table shows not permissible combination for real configuration

900

| Number of Batched in the station=1 ||||||| 
|---|---|---|---|---|---|---|
| Appointed BOAT(Y) | 1 | 2 | 3 | 4 | 5 | 6 |
| Start Boat(Z) | Order of Material for processing ||||||
| 1 | 1 | ERROR | ERROR | ERROR | ERROR | ERROR |
| 2 | ERROR | 1 | ERROR | ERROR | ERROR | ERROR |
| 3 | ERROR | ERROR | 1 | ERROR | ERROR | ERROR |
| 4 | ERROR | ERROR | ERROR | 1 | ERROR | ERROR |
| 5 | ERROR | ERROR | ERROR | ERROR | 1 | ERROR |
| 6 | ERROR | ERROR | ERROR | ERROR | ERROR | 1 |

| Number of Batched in the station=2 |||||||
|---|---|---|---|---|---|---|
| Appointed BOAT(Y) | 1 | 2 | 3 | 4 | 5 | 6 |
| Start Boat(Z) | Order of Material for processing ||||||
| 1 | 1 | 2 | ERROR | ERROR | ERROR | ERROR |
| 2 | ERROR | 1 | 2 | ERROR | ERROR | ERROR |
| 3 | ERROR | ERROR | 1 | 2 | ERROR | ERROR |
| 4 | ERROR | ERROR | ERROR | 1 | 2 | ERROR |
| 5 | ERROR | ERROR | ERROR | ERROR | 1 | 2 |
| 6 | ERROR | ERROR | ERROR | ERROR | ERROR | N/T |

| Number of Batched in the station=3 |||||||
|---|---|---|---|---|---|---|
| Appointed BOAT(Y) | 1 | 2 | 3 | 4 | 5 | 6 |
| Start Boat(Z) | Order of Material for processing ||||||
| 1 | 1 | 2 | 3 | ERROR | ERROR | ERROR |
| 2 | ERROR | 1 | 2 | 3 | ERROR | ERROR |
| 3 | ERROR | ERROR | 1 | 2 | 3 | ERROR |
| 4 | ERROR | ERROR | ERROR | 1 | 2 | 3 |
| 5 | ERROR | ERROR | ERROR | ERROR | N/T | N/T |
| 6 | ERROR | ERROR | ERROR | ERROR | ERROR | N/T |

| Number of Batched in the station=4 |||||||
|---|---|---|---|---|---|---|
| Appointed BOAT(Y) | 1 | 2 | 3 | 4 | 5 | 6 |
| Start Boat(Z) | Order of Material for processing ||||||
| 1 | 1 | 2 | 3 | 4 | ERROR | ERROR |
| 2 | ERROR | 1 | 2 | 3 | 4 | ERROR |
| 3 | ERROR | ERROR | 1 | 2 | 3 | 4 |
| 4 | ERROR | ERROR | ERROR | N/T | N/T | N/T |
| 5 | ERROR | ERROR | ERROR | ERROR | N/T | N/T |
| 6 | ERROR | ERROR | ERROR | ERROR | ERROR | N/T |

| Number of Batched in the station=5 |||||||
|---|---|---|---|---|---|---|
| Appointed BOAT(Y) | 1 | 2 | 3 | 4 | 5 | 6 |
| Start Boat(Z) | Order of Material for processing ||||||
| 1 | 1 | 2 | 3 | 4 | 5 | ERROR |
| 2 | ERROR | 1 | 2 | 3 | 4 | 5 |
| 3 | ERROR | ERROR | N/T | N/T | N/T | N/T |
| 4 | ERROR | ERROR | ERROR | N/T | N/T | N/T |
| 5 | ERROR | ERROR | ERROR | ERROR | N/T | N/T |
| 6 | ERROR | ERROR | ERROR | ERROR | ERROR | N/T |

| Number of Batched in the station=6 |||||||
|---|---|---|---|---|---|---|
| Appointed BOAT(Y) | 1 | 2 | 3 | 4 | 5 | 6 |
| Start Boat(Z) | Order of Material for processing ||||||
| 1 | 1 | 2 | 3 | 4 | 5 | 6 |
| 2 | ERROR | N/T | N/T | N/T | N/T | N/T |
| 3 | ERROR | ERROR | N/T | N/T | N/T | N/T |
| 4 | ERROR | ERROR | ERROR | N/T | N/T | N/T |
| 5 | ERROR | ERROR | ERROR | ERROR | N/T | N/T |
| 6 | ERROR | ERROR | ERROR | ERROR | ERROR | N/T |

FIG. 9

METHOD FOR AUTOMATICALLY CHECKING SEQUENCE OF LOADING BOATS AND BATCHES FOR SEMICONDUCTOR MANUFACTURING PROCESS

BACKGROUND OF THE INVENTION

1. Field of the Invention

The present invention relates to a method for checking a loading sequence for a semiconductor manufacturing process in a manufacturing device, and more particularly to a method for automatically checking a sequence of loading boats and batches for a semiconductor manufacturing process in a manufacturing device.

2. Description of Related Art

A conventional furnace machine requires a specific boat for certain models or manufacturing processes, and in the past, operators calculate a loading sequence manually, and then place the material into a specified boat. However, errors often occur for the manual operations.

Additionally, as for the conventional furnace machine with a certain model or manufacturing process, the requirements for the runnable boat position for the material can be determined according to the parameter for the previous running operation. At this point, operators must look up the measuring results of the previous running operation by themselves, calculate the runnable boat position, schedule the loading sequence, and place the material into the runnable boat. Such operation has a risk of manual operation mistakes.

In order to avoid the risk of manual operation mistakes, the current furnace is further added with a furnace move-in double confirm mechanism. Referring to FIG. 1A, it mainly illustrates the move-in double confirm mechanism in the operation flow of the furnace.

Firstly, as shown in 1A, the whole operation flow includes a manual operation checking stage and a confirm stage. The manual operation checking stage includes a dispatch determining procedure 110, in which the information about the material precautions 112 relevant to the furnace operation, the maximum number of executable batches 114, and the execution results 116 of the previous running operation are firstly obtained, so as to perform the dispatching procedure 110. Next, the dispatching data is inputted into the machine end, and a boat table 118 of the machine end is generated. Subsequently, according to the boat table 118 at the machine end, the operators calculate the loading sequence 120 by themselves.

Thereafter, in the confirm stage, the aforementioned furnace move-in double confirm mechanism is employed. After the loading sequence is calculated, and the material enters the station 122 successfully, a double confirm interface 124 is popped up in the machine to let the user know whether the current boat batch is consistent with the loading sequence or not. In this interface, the current loading sequence is displayed, and through a simple input device, for example, reading a bar code on the boat, whether the boat batch is correct or not may be displayed. As shown in the figure, the content in the loading batch is compared with the content displayed on the double confirm interface 124 to confirm whether they are consistent or not (step 126). If they are inconsistent, as shown in Step 128, a loading failure is displayed, and the machine cannot load the material or run the process. However, if they are consistent, as shown in Step 130, a loading succeed is displayed, and the machine begins to load the material and manufacturing process.

The detailed operation flow of the furnace move-in double confirm mechanism is shown in FIG. 1B. Firstly, the move-in operation is performed, as shown in Step 132. Next, it is determined whether this batch has been loaded completely or not, as shown in Step 134. If the batch has already been loaded, as shown in Step 136, the double confirm user interface (UI) is closed. If the batch has not been loaded yet, as shown in Step 138, a load request is sent to the machine. Then, as shown in Step 140, an open door command is sent out. After the open door command for the furnace is sent out, as shown in Step 142, a user interface (UI) is popped out in the machine, so as to detect whether the ID of a cassette is correct or not. If it is incorrect, as shown in Step 146, a frame is popped up to display that the batch material is reported to be incorrect, and after the confirmation, the ID data of the cassette in the field of the incorrect batch material should be deleted, which is convenient for the second confirmation. If the ID of the cassette is correct, as shown in Step 144, the furnace opening is informed to be closed, and then, the flow returns to Step 134 to determine whether the next batch has been completed or not.

FIG. 1C shows the UI popped out in the machine. In the frame 150, the number of the Port ID is shown, such as "1" and "2" shown in the field. The row data marked by 152 mainly shows boat numbers ordered by the machine, such as "69298" and "69299" in the figure, and the field of the row data marked by 152 is mainly provided for being compared with the boat number obtained by the user through using a bar code reader. For example, if the boat number (the position marked with 156 in the figure) read by the bar code reader corresponding to the Port ID numbered with 1 is "69298", and the boat number (the position marked with 158 in the figure) corresponding to the Port ID numbered with 2 is "69299", the data is considered to be correct after being compared by the machine. However, if the boat number read by the bar code reader corresponding to the Port ID numbered with 1 is not "69298", and the boat number corresponding to the Port ID numbered with 2 is not "69299", an error report message is popped out after being compared by the machine, such as the error report message frame 160 shown in FIG. 1D.

The move-in double confirm mechanism is added into the machine, which truly decreases the errors for the human determination. However, only the batches entering into the station are compared, but the loading sequence cannot be checked.

SUMMARY OF THE INVENTION

The present invention is directed to a method for automatically checking a sequence of loading boats and batches for a semiconductor manufacturing process in a manufacturing device, in which according to a developed logic, a loading sequence is automatically calculated through a system, and by comparing the actual loading sequence with the calculated sequence when the boats are entering, it is ensured that no errors occur when loading the boats in the batches. When loading the boats in the batches, operators can truly load the boats in the batches according to the entering sequence together with the current confirmation mechanism, such that the boat positions of the loaded materials are correct.

The present invention is directed to a method for automatically checking a sequence of loading boats and batches for a semiconductor manufacturing process in a manufacturing device, which is capable of calculating the loading sequence through the developed logic by automatically determining the runnable boat positions for the material after recording the parameter for detecting a previous boat by the system.

To be embodied and broadly described herein, the present invention provides a method for automatically checking a sequence of loading boats and batches for a semiconductor manufacturing process in a manufacturing device, which includes calculating a loading sequence according to an algorithm logic, for being used in a sequence comparison when the material enters the manufacturing device; and when loading the material, an operator loads the material into a corresponding boat position according to the loading sequence together with a confirmation mechanism.

In the aforementioned method, the step of calculating the loading sequence through the algorithm logic includes recording a parameter for detecting the previous boat, next, the runnable boat positions are automatically determined, and then, the loading sequence is calculated through the algorithm logic.

In the aforementioned method, the loading sequence calculated through the algorithm logic is calculated through information on the number of dispatched batches, specified boat information, and a loaded boat table. In another embodiment, the loading sequence is further calculated through a history record for detecting each boat and information on the runnable boat positions for the material.

In the aforementioned method, the loading sequence calculated through the algorithm logic is calculated according to the requirement that both a dummy account and a real account are together entered into the manufacturing device.

In the aforementioned method, the loading sequence calculated through the algorithm logic is calculated through information on the number of entered batches, specified boat information, and a loaded boat table.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic view of an example of the real operation of the mechanism for automatically checking a sequence of loading boats according to the present invention.

FIG. 4 shows boats specified according to the material in the mechanism for automatically checking a sequence of loading boats according to the present invention.

FIG. 5A shows precautions obtained according to the model in the mechanism for automatically checking a sequence of loading boats according to the present invention.

FIG. 5B shows the precautions required by the model "H2N36" in the mechanism for automatically checking a sequence of loading boats according to the present invention.

FIG. 9 shows a loading sequence table obtained by the system according to an existing logic in the mechanism for automatically checking a sequence of loading boats according to the present invention.

DESCRIPTION OF EMBODIMENTS

The present invention provided a method for automatically checking a sequence of loading boats and batches for a semiconductor manufacturing process in a manufacturing device, in which according to a developed logic, a loading sequence is calculated automatically through a system, and by comparing the actual loading sequence with the calculated sequence when the boats are entering, it is ensured that no errors occur when loading the boats in the batches. When loading the boats in the batches, operators truly loads the boats in the batches according to the entering sequence together with the current confirmation mechanism or the above move-in double confirm mechanism, so that the boat positions of the loaded materials are correct.

The present invention provides a method for automatically checking a sequence of loading boats and batches for a semiconductor manufacturing process in a manufacturing device, which is capable of calculating the loading sequence through the developed logic by automatically determining the runnable boat positions for the material after recording the parameter for detecting the previous boat by the system.

Figure 1A:
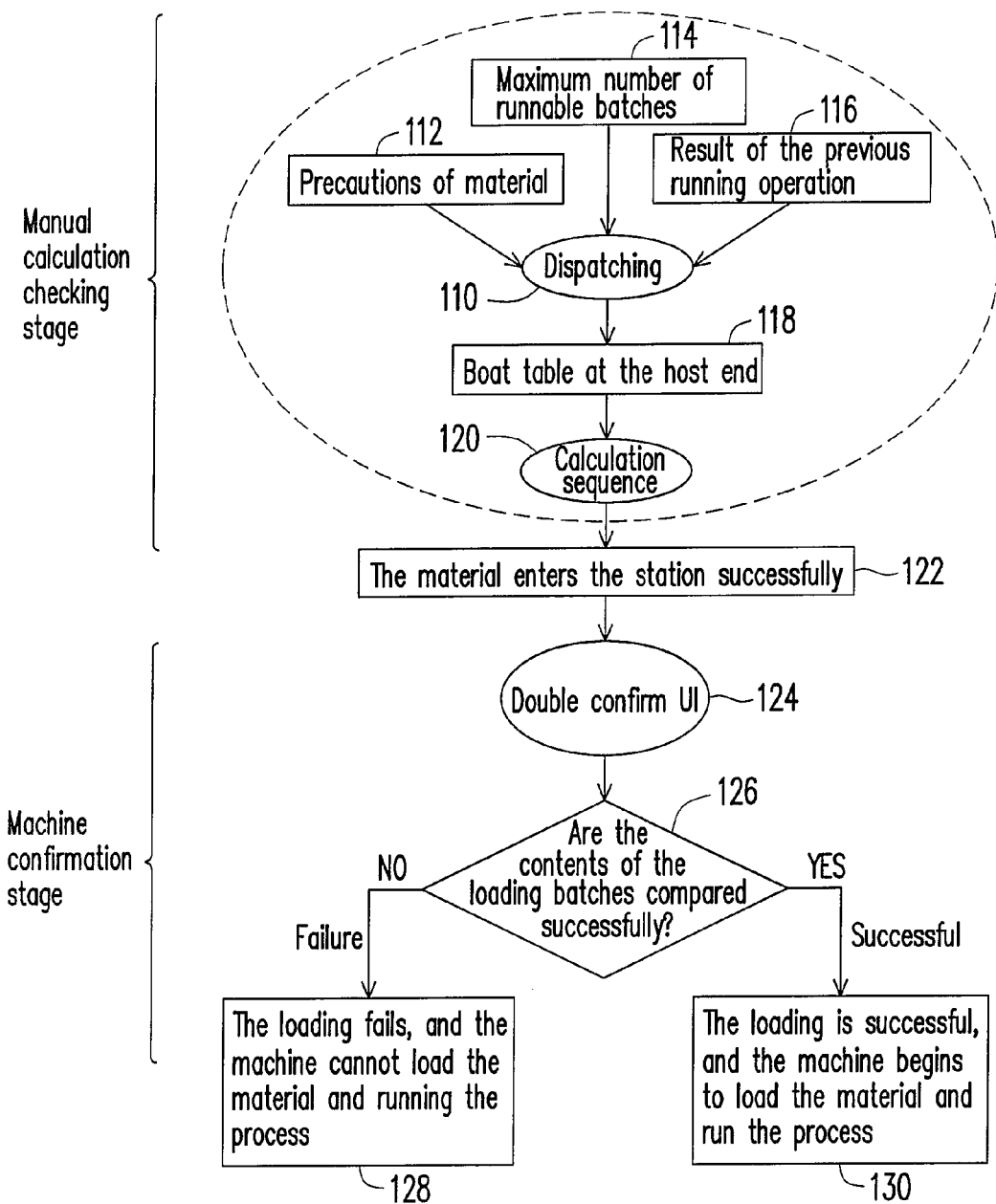
FIG. 1A is a schematic flow chart of a furnace operation flow with the move-in double confirm mechanism.
Figure 1B:
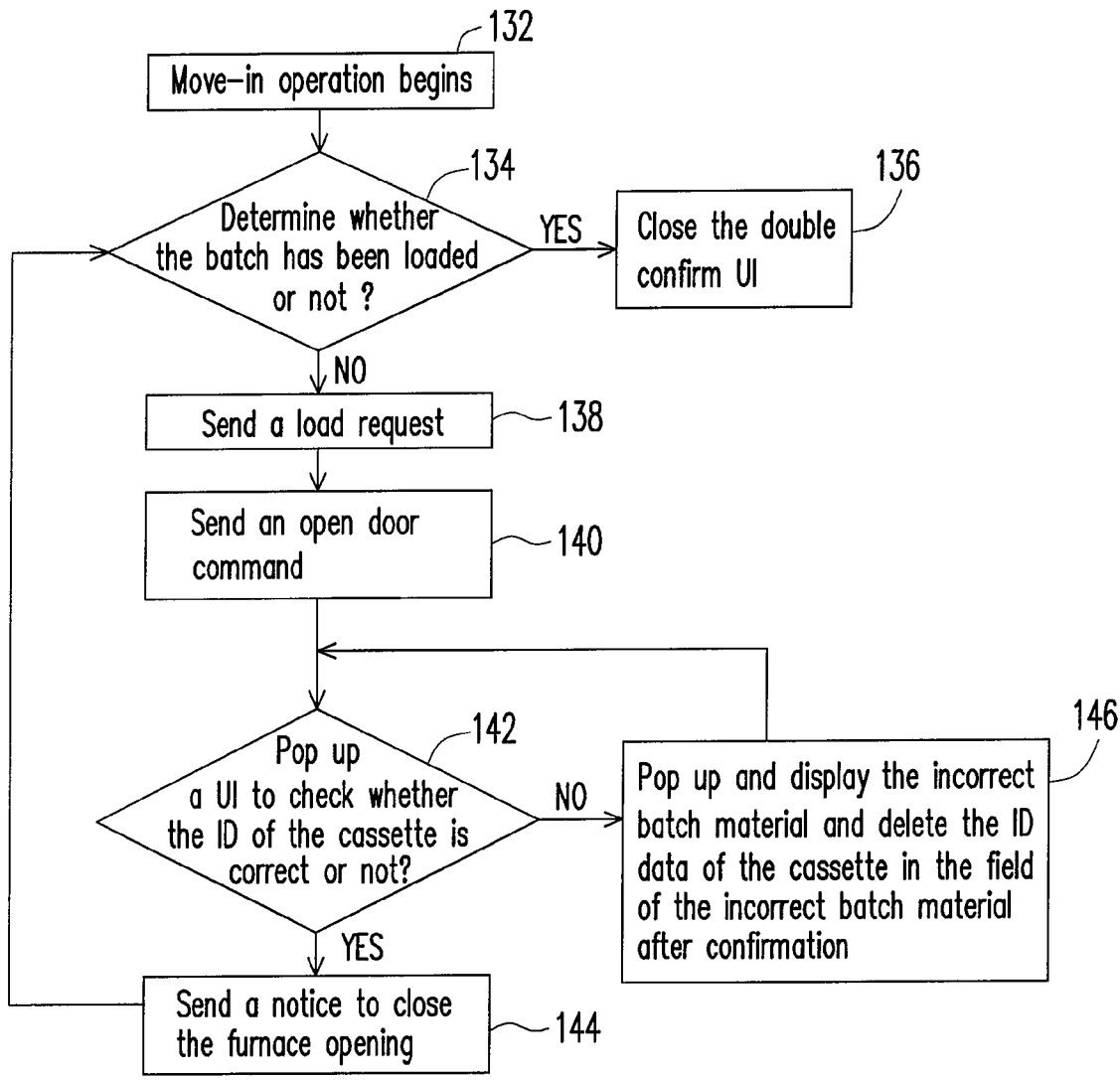
FIG. 1B is a detailed schematic flow chart of the furnace move-in double confirm mechanism.
Figures 1C, 1D:
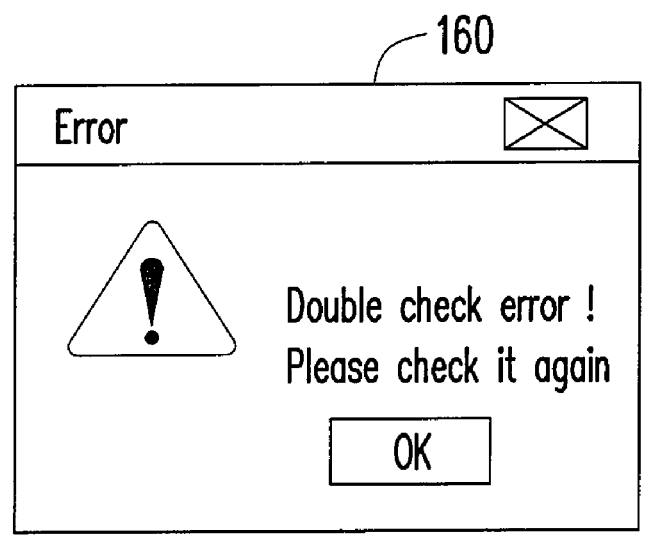
FIG. 1C shows a UI popped up in the machine during the furnace operation flow in FIG. 1A.
FIG. 1D shows an error report frame popped up during the furnace operation flow in FIG. 1A.
Figure 2:
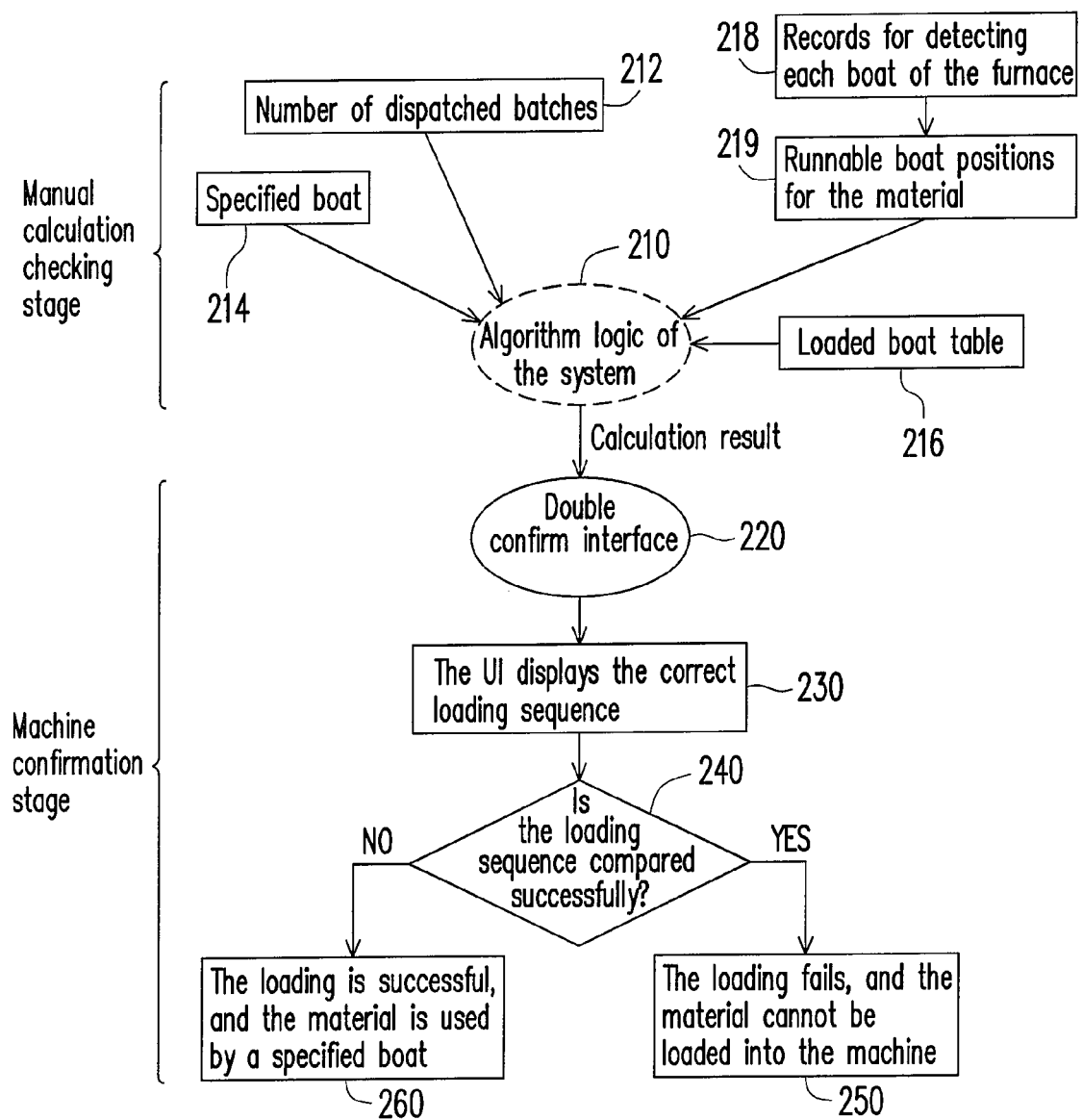
FIG. 2 is a flow chart of a method for automatically checking a sequence of loading boats and batches for a semiconductor manufacturing process in a manufacturing device according to a preferred embodiment of the present invention.

Referring to FIG. 2, it is a flow chart of a method for automatically checking a sequence of loading boats and batches for a semiconductor manufacturing process in a manufacturing device according to a preferred embodiment of the present invention. Herein, the process of manufacturing the furnace is taken as an example, and the present invention is not limited to such manufacturing process, but applicable for all manufacturing devices, as long as the loading sequence must be calculated and compared when the boats enter the station, so as to ensure that the loading sequence of batches is correct.

Firstly, when the move-in operation begins, the mechanism for automatically checking a sequence of loading boats of the present invention utilizes the system algorithm logic 210 to determine whether the sequence is required to be checked or not. The system algorithm logic 210 receives the number of dispatched batches 212, whether the machine specifies a boat or not 214, and a loaded boat table 216 to serve as the basis for determination. In a selected embodiment, the following relevant data may also be taken into consideration, such as a history record 218 for detecting each boat of the furnace and the runnable boat positions 219 for the material. After being calculated through the system algorithm logic 210, the result is transmitted to a double confirm interface 220 to perform the double confirm operation. After that, as shown in Step 230, the correct loading sequence is displayed on the UI, and the loading sequence is compared, as shown in Step 240. If the loading sequence is compared successfully, as shown in Step 250, the material is provided to be used by the specified boat. If the loading sequence is compared unsuccessfully, as shown in Step 260, the material cannot be provided to be used by the specified boat.

System Algorithm Logic

The algorithm logic adopted by the mechanism for automatically checking a sequence of loading boats according to an embodiment of the present invention is illustrated as follows.

It is assumed that Y is a specified boat, Z is an initial boat, and X is a loading sequence, X (loading sequence)=Y (specified boat)+1−Z (initial boat).

If X is larger than 0 (X>0), the loading sequence is X.

If X is smaller than or equal to 0 (X<=0), or X is larger than number of the batches that enter the station, an error report message is displayed and a program is executed to modify the error.

If a generalized formula of the algorithm logic is employed, the modification is listed as follows.

It is assumed that Y is a specified boat (if the boats are arranged as A-F and the specified boat is B, Y=2); Z is the initial boat (if the initial boat is 3, Z=3); X is the loading sequence; and G represents a data set of the data between Y and Z, and if there are three runnable boats, Y-Z can be combined in three ways.

The generalized formula of the algorithm logic also may be expressed as follows:

If it is from $g_i$ to G, G is {Y−Z}.

If $g_i$<0, an error report message is displayed and a program is executed to modify the error; and if $g_i$>=0, any one is selected from ($g_i$ or $g_{i+1}$) and then added by 1, to act as X, i.e., ($g_i$ or $g_{i+1}$)+1=X.

If a generalized formula of the algorithm logic for determining a signal boat is adopted, the content is listed as follows.

It is assumed that Y is a specified boat; Z is an initial boat; and X is a loading sequence. If Y<Z, an error report message is displayed, and a program is executed to modify the error;

if $Y=Z$, $X=1$; and if $Y>Z$, $X=Y-Z+1$.

For example, it is assumed that G={g1, g2}, i.e., the runnable boats for the material are g1 and g2, and if g1 is smaller than 0 (g1<0) and g2 is larger than 0 (g2>0), g2+1=X;

if g1 is smaller than 0 (g1<0) and g2 is smaller than 0 (g2<0), an error report message is displayed and a program is executed to modify the error; and if g1 is larger than or equal to 0 (g1>=0) and g2 is larger than or equal to 0 (g2>=0), any one is selected from (g1 or g2) and then added by 1, to act as X, i.e., (g1 or g2)+1=X.

Description of Embodiments

As for the mechanism for automatically checking a sequence of loading boats provided by the present invention, the actual operation example is shown in FIG. 3.

There are six boats A-F in a trolley 310, the boat table at the machine end is shown in 320, and the sequence for the batches 1-6 entering the station are "DCCBBA" shown in the corresponding boat table. It is assumed that the number of the batches entering the station is 4, and then, 4 batches are placed therein beginning from the boat B, and if the number of the batches entering the station is 3, 3 batches are placed therein beginning from the boat C.

FIG. 4 shows boats specified according to the material. It is assumed that the model of the product is CY63315A, and it is marked in the material of the model that, if the number of the boats is not 2 (i.e., the specified boat Y=2), they are rejected to enter the station. The initial boat table at the machine end is shown in 410, and it is assumed that the number of the batches to enter the station is 4, the initial boat Z=2. According to the aforementioned conditions, the sequence for the material to entering the station is X (loading sequence)=Y (specified boat)+1−Z(initial boat), i.e., X−Y+1−Z=2+1−2=1. If the operator sequentially inputs the boat IDs, for example, reading the information represented by a bar code through using a bar code reader, according to the mechanism for automatically checking a sequence of loading boats of the present invention, the system will send an alarm message to reject the boat to enter the station, if the entering sequence for the batch of the material is not "1".

FIG. 5A shows precautions obtained according to the model, such as the precautions of the aforementioned model CY63315A, and FIG. 5B shows precautions required by the model "H8N36". These precautions serve as the basis for the logic determination in the mechanism for automatically checking a sequence of loading boats provided by the present invention.

Figure 6:
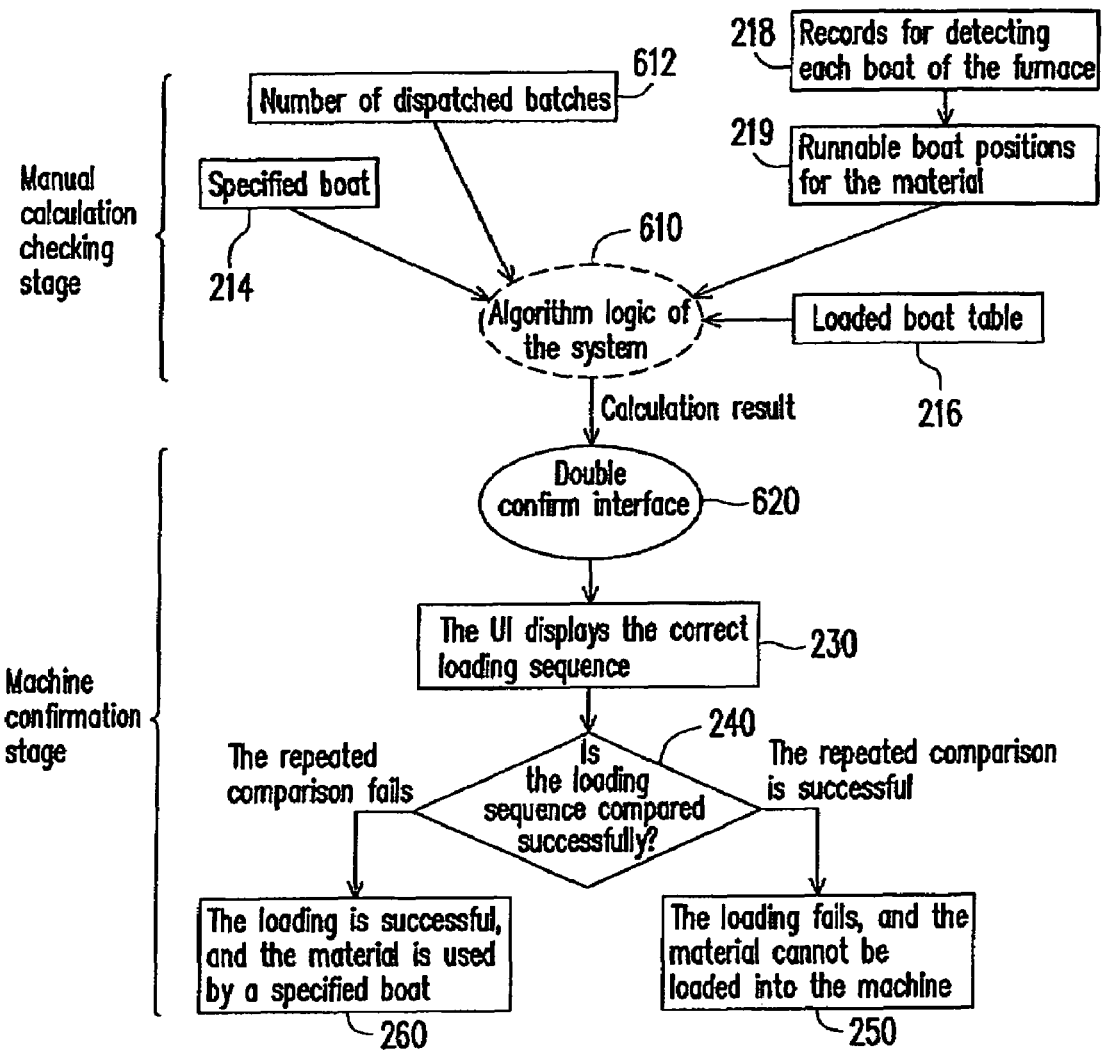
FIG. 6 is a flow chart of a method for automatically checking a sequence of loading boats and batches for a semiconductor manufacturing process in a manufacturing device according to another embodiment of the present invention.
Figure 7:
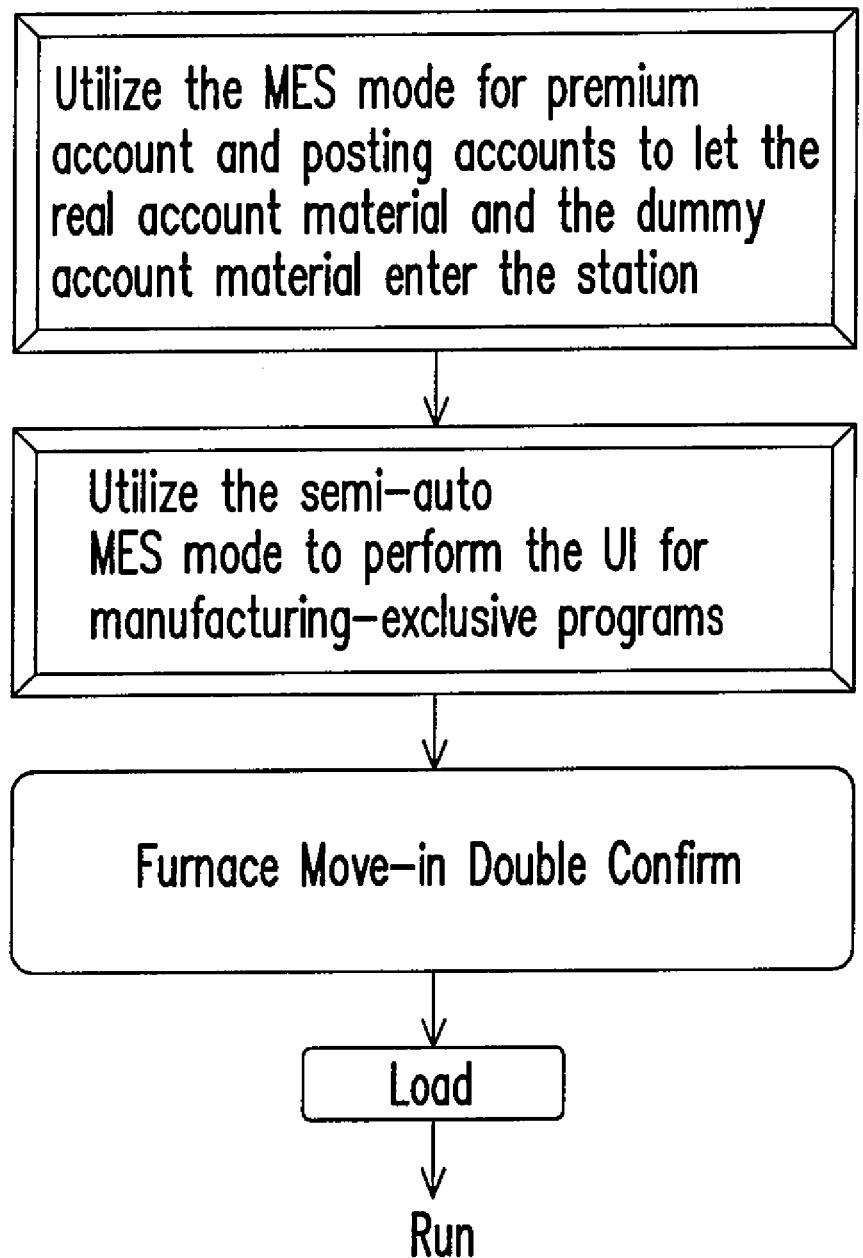
FIG. 7 shows a confirmation flow of an MES mode for premium account and posting accounts to let the real account material and the dummy account material enter the station in the mechanism for automatically checking a sequence of loading boats according to the present invention.

FIG. 6 is a flow chart of a method for automatically checking a sequence of loading boats and batches for a semiconductor manufacturing process in a manufacturing device according to another embodiment of the present invention, which is substantially the same as that in FIG. 2, but the difference lies in the consideration of the requirements that the dummy account and real account should enter the station at the same time. Furthermore, the reference numbers shown in FIG. 6 indicate the steps and the elements as same as the steps and the elements labeled with the same reference numbers shown in FIG. 2. In the system algorithm logic 610, the number of the batches 612 entering the furnace is considered, instead of the number of the dispatched batches. When performing the double confirm by the double confirm interface 620, a confirmation flow of utilizing an MES mode for premium account and posting accounts to let the real account material and dummy account material enter the station is considered. The confirmation flow of utilizing the MES mode for premium account and posting accounts to let the real account material and the dummy account material enter the station is shown in FIG. 7.

Figure 8:
FIG. 8 shows display results on the UI for manufacturing-exclusive programs in the mechanism for automatically checking a sequence of loading boats according to the present invention.

FIG. 8 shows display results on the UI for manufacturing-exclusive programs, including the boat IDs "65635X", "62823M", "68522U", and "68454P", which are real account materials, and the boat ID "S23947", which is a dummy account material. According to the boat IDs, such as bar code information, the double confirm interface compares all the boats to display the dummy account materials and the real account materials respectively.

FIG. 9 shows a loading sequence table 900 obtained by the system according to an existing logic in the mechanism for automatically checking a sequence of loading boats according to the present invention. In this table, the loading sequence of the entered station is shown. During the loading period, operators can truly load the boats in the batches according to the entering sequence together with the current confirmation mechanism or the move-in double confirm mechanism, such that the boat positions of the loaded materials are correct.

The present invention provides a method for automatically checking a sequence of loading boats and batches for a semiconductor manufacturing process in a manufacturing device, which is capable of displaying the result displayed on the UI through using the mechanism for automatically checking a sequence of loading boats in the present invention, so as to substitute the original calculation manner that requires the manual determination, and thereby decreasing the errors for the manual determination. In addition, the UI for automatically checking a sequence of loading boats provided by the present invention may be applicable in boats, slots, reaction chambers, chemical stations, a plurality of furnaces, or an entering sequence for the specified station. The UI for automatically checking a sequence of loading boats provided by the present invention is also applicable for the requirement that the dummy account and the real account enter the station at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for automatically checking a sequence of loading boats and batches for a semiconductor manufacturing process in a manufacturing device, comprising:

determining a specified boat and an initial boat from the loading boats;

calculating a loading sequence according to an algorithm logic, for being used in a sequence comparison when a material enters a manufacturing device, wherein the algorithm logic determining the loading sequence is based on a loading order relationship between the specified boat and the initial boat; and when loading the material, an operator loading the material into a corresponding boat position according to the loading sequence together with a confirmation mechanism.

2. The method for automatically checking the sequence of loading boats and batches for a semiconductor manufacturing process in a manufacturing device as claimed in claim 1, wherein the confirmation mechanism is a move-in double confirm mechanism for further confirming whether the corresponding boat position matches the loading sequence.

3. The method for automatically checking the sequence of loading boats and batches for a semiconductor manufacturing process in a manufacturing device as claimed in claim 1, wherein the step of calculating the loading sequence according to an algorithm logic includes recording a parameter for detecting a previous boat, next, automatically determining a runnable boat position for the material; and then, calculating the loading sequence according to the algorithm logic.

4. The method for automatically checking the sequence of loading boats and batches for a semiconductor manufacturing process in a manufacturing device as claimed in claim 1, wherein the manufacturing device is a furnace machine.

5. The method for automatically checking the sequence of loading boats and batches for a semiconductor manufacturing process in a manufacturing device as claimed in claim 1, wherein the loading sequence calculated through the algorithm logic is calculated through information on a number of dispatched batches, specified boat information, and a loaded boat table.

6. The method for automatically checking the sequence of loading boats and batches for a semiconductor manufacturing process in a manufacturing device as claimed in claim 5, wherein the loading sequence calculated through the algorithm logic is further calculated through a history record of detecting each boat and information on runnable boat positions for the material.

7. The method for automatically checking the sequence of loading boats and batches for a semiconductor manufacturing process in a manufacturing device as claimed in claim 1, wherein the loading sequence calculated through the algorithm logic is calculated through information on a number of entered batches, specified boat information, and a loaded boat table.

8. The method for automatically checking the sequence of loading boats and batches for a semiconductor manufacturing process in a manufacturing device as claimed in claim 7, wherein the loading sequence calculated through the algorithm logic is further calculated according to a history record for detecting each boat and information on runnable boat positions for the material.

* * * * *